United States Patent [19]

Peng

[11] Patent Number: 4,878,074
[45] Date of Patent: Oct. 31, 1989

[54] DYNAMIC PARTICULATE OBSERVATION APPARATUS

[75] Inventor: Yu-Yin Peng, Hsinchu Hsien, Taiwan

[73] Assignee: Industrial Technology Research Institute, Taiwan, Taiwan

[21] Appl. No.: 204,566

[22] Filed: Jun. 6, 1988

[51] Int. Cl.$^4$ .................. G03B 29/00; G01P 3/38; G01P 3/40

[52] U.S. Cl. ........................ 354/76; 354/126; 346/107 R; 356/23

[58] Field of Search ............... 354/75, 76, 81, 290, 354/307, 126, 145.1; 356/23; 346/75, 107 R, 140 R; 352/84; 355/21

[56] References Cited

U.S. PATENT DOCUMENTS

| 2,220,373 | 11/1940 | Krauser et al. | 354/307 |
| 3,308,714 | 3/1967 | Friedel | 354/290 |
| 4,222,655 | 9/1980 | Norris | 355/21 |

FOREIGN PATENT DOCUMENTS 60-255445 12/1985 Japan ........................ 356/23

OTHER PUBLICATIONS

IBM Journal of Research and Development, vol. 21, No. 1, 1977, pp. 56-68, "Study of Fluid Flow Through Scoled-Up Ink Jet Nozzles", Levanoni.
Applied Optics, vol. 19, 6, Mar. 15, 1980, "Versatile Microsecond Movie Camera", R. W. Dreyfus, pp. 905-908.

Primary Examiner—A. A. Mathews
Attorney, Agent, or Firm—Ladas & Parry

[57] ABSTRACT

A dynamic particulate observation apparatus for monitoring a moving particle comprises a black box having an internal space enclosed therewithin, which shields said space from the infiltration of light outside; means for generating particles moving across said black box; means for emitting flash light within said black box at a predetermined frequency; and means for taking down the images of the particles generated by said generating means when said emitting means emits flashlights. The dynamic particulate observation apparatus according to this invention is cheap and easy to assemble, and renders all the necessary functions of a conventional dynamic particulate observation apparatus.

7 Claims, 4 Drawing Sheets t1 t2 t1 t2

DYNAMIC PARTICULATE OBSERVATION APPARATUS

BACKGROUND OF THE INVENTION

The present invention relates to a dynamic particulate observation apparatus, and particularly to a dynamic particulate observation apparatus which is cheap and easy to assemble.

It is customary to observe in the laboratory the motion of a particle by utilizing a synchro-flash bulb which emits flashes synchronizing with signals from a signal generator to enable researchers to effect a visual observation. Alternatively, researchers can use a conventional particulate observation apparatus available on the market to carry out his precise observations and measurements. A synchro-flash bulb is much cheaper than a particulate observation apparatus, but it alone is difficult to effect a visual observation on the motion of particles whose diameters are less than 1 m.m. On the other hand, a conventional particulate observation apparatus is expensive and not easy to maintain.

SUMMARY OF THE INVENTION

It is therefore the object of this invention to provide a dynamic particulate observation apparatus which is easy to assemble.

It is another object of this invention to provide a dynamic particulate observation apparatus which traces out moving particles.

It is another object of this invention to provide a dynamic particulate observation apparatus which provides data for calculating speeds of moving particles.

It is another object of this invention to provide a dynamic particulate observation apparatus which takes down diameters and shapes of moving particles.

It is another object of this invention to provide a dynamic particulate observation apparatus which records locations of a moving particle at predetermined time intervals.

The above objects can be achieved by a dynamic particulate observation apparatus which comprises a black box having an internal space enclosed therewithin and shielded completely to prevent from the infiltration of light outside; means for generating particles moving across said black box; means for emitting flash light within said black box at a predetermined frequency; and means for recroding images of particles generated by said generating means when said emitting means emits flashlights.

Other and further objects, features and advantages of this invention will appear more fully in the following description.

BRIEF DESCRIPTION OF THE DRAWINGS

This invention will be explained in more detail on the basis of an exemplary embodiment with reference to the drawings, in which.

DETAILED DESCRIPTION OF THE PREFERRED EMBODIMENT

Figure 1:
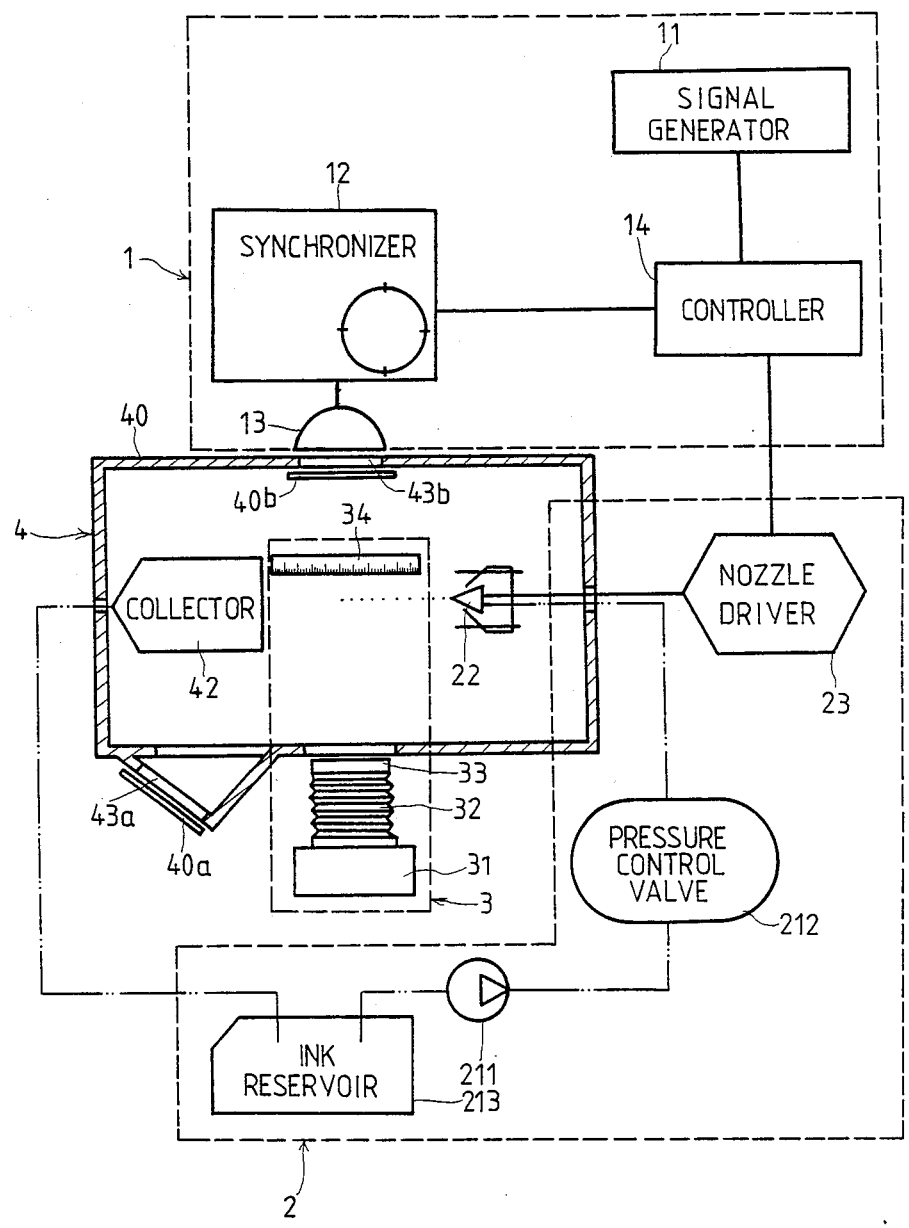
FIG. 1 is a simplified diagram showing the lay-out of a preferred embodiment of a dynamic particulate observation apparatus according to this invention.

As shown in FIG. 1, the dynamic particulate observation apparatus according to this invention comprises a flash synchronizing assembly 1, a particle generating assembly 2, a photographing assembly 3 and a black box assembly 4. The flash synchronizing assembly 1 comprises a signal generator 11, a synchronizer 12, a flash bulb 13 and a controller 14. The particles to be observed in this embodiment are ink particles, therefore, the particle generating assembly 2 is composed of a pump 211, a pressure control valve 212, an ink reservoir 213, a nozzle 22 and a nozzle driver 23. The photographing assembly 3 comprises a camera 31, a bellows 32, a lens 33 and a scale 34. The black box assembly 4 comprises a black box 40, a nozzle mounting frame 44 (see FIG. 2) annd a collector 42.

As shown in FIG. 1, the signal generator 11 is coupled with the controller 14 which in turn couples with both the synchronizer 12 and the nozzle driver 23. The synchronizer 12 also couples with the flash bulb 13. By this arrangement, the controller 14 will send signals to the flash bulb 13 via the synchronizer 12 to enable the flash bulb 13 to emit flashes at predetermined frequency when the signal generator 11 transmits a series of pulses to the controller 14, and simlutaneously, the nozzle driver 23 will receive signals from the controller 14 to drive the nozzle 22 to eject ink particles at the same predetermined frequency for the purpose of observation. The synchronizer 12 is used for adjusting the time lag between the initiating pulses sent from the signal generator 11 and the initiating flashes emitted from the flash bulb 13. In other words, the synchronizer 12 can adjust accordingly any time lag between the initiating of pulses of the flash bulb 13 and the initiating flashes of the nozzle driver 23.

Furthermore, as shown in FIG. 1, the ink stored in the ink reservoir 213 can be pumped to the nozzle 22 by the pump 211 via the pressure control valve 212, and the nozzle 22 is driven to eject ink particles at predetermined frequency by the nozzle driver 23. The camera 31 is mounted on the bracket 34 (see FIG. 2), which couples with the lens 33 via the bellows 32. The camera 31 can enlarge or squeeze the image of particle by means of adjusting the distance between the camera 31 and the lens 33 which inserts into the black box 40.

Figure 2:
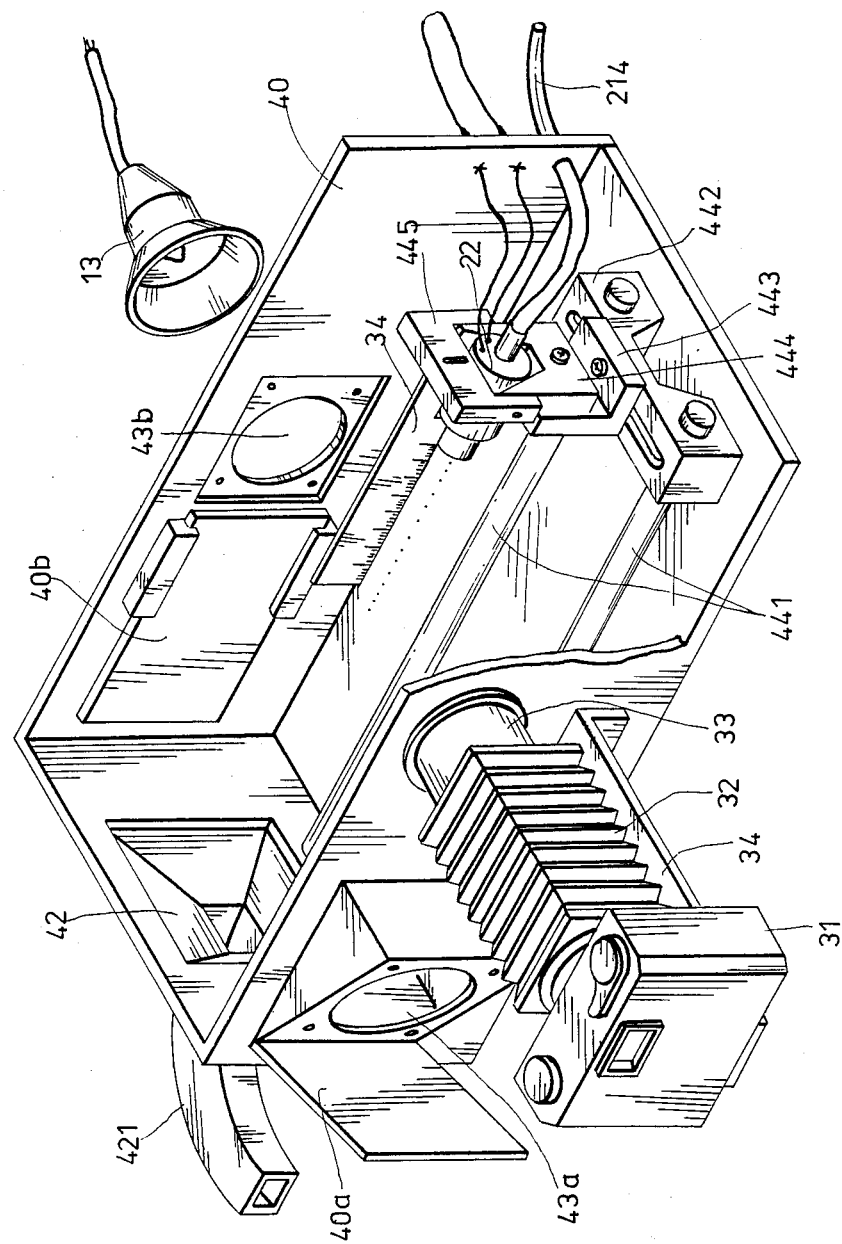
FIG. 2 is a perspective view showing the main portion of the embodiment shown in FIG. 1, with the black box partially taken apart.

As shown in FIG. 2, a pair of parallel rails 441, 441 are provided adjacent to the inner bottom surface of the black box 40, and the base 442 of the nozzle mounting frame 44 is slidably mounted on the rails 441, 441, so that the nozzle mounting frame 44 can be pushed to move along the rails 441, 441. The block 443 is releasably secured on the base 442, so that the distance between the nozzle 22 and the lens 33 can be adjusted. The block 444 is slidably mounted on the block 443 so as to adjust the elevation of the nozzle 22, and the nozzle 22 is mounted on the "V" shaped slot of the block 444 by means of the block 445. By this arrangement, the elevation of the nozzle 22 can be adjusted.

The flash bulb 13 can be mounted on the observation door 43a or 43b, and two shields 40a, 40b are mounted thereon, respectively, before the mounting of the flash bulb 13 to insulate the black box 40 from the infiltration of light outside. The ink is induced via the hose 214 into the nozzle 22 and is ejected by the nozzle 22 into the black box 40 in the form of particles which will move across the black box 40 and reach the collector 42, and finally the ink particles will be induced back to the ink reservoir 213.

The following is the description of the operation of the preferred embodiment of the dynamic particulate observation apparatus according to this invention.

The various states listed hereinafter can be observed by the preferred embodiment of the dynamic particulate observation apparatus according to this invention.

(1) The speed and the diameter of a single particle,
(2) The tracing of a single moving particle,
(3) The shape of an ink particle at the instant of leaving the nozzle, and
(4) The shape of the leading ink particle at the instant of leaving the nozzle when ejetion is initiated.

Figure 3:
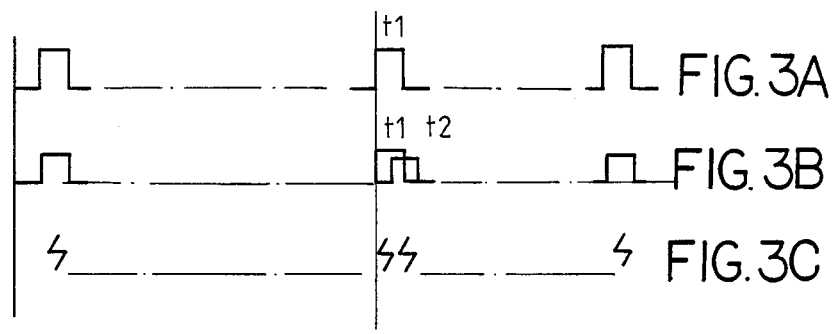
FIGS. 3A, 3B and 3C are waveforms showing the time relationship among pulses sent to nozzle driver and flash synchronizer, respectively, and the flashlight emitted from the flash blub, when the speed of a moving ink particle is to be measured.
Figure 4A:
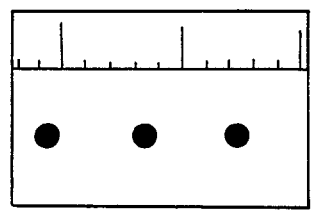
FIGS. 4A and 4B are pictures taken at time t1 and t2 shown in FIG. 3B, respectively.
Figure 4B:
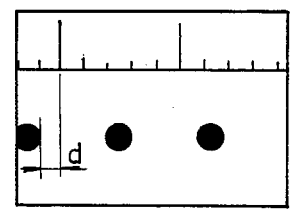
Figure 5:
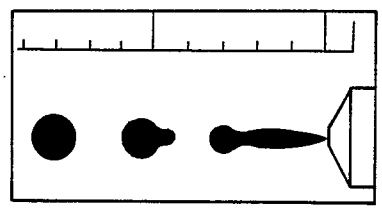
FIG. 5 is the picture taken at the time an ink particle is leaving the nozzle.

The shutter of the camera 31 keeps open throughout all the observations. As shown in FIG. 3A, the controller 14 is preset in a manner that it can drive the flash bulb 13 to emit flashlight (FIG. 3C) at time t1 (FIG. 3A) after the nozzle driver 23 has received some pulses from the signal generator 11. It is to be noted that the flash bulb 13 is mounted on the observation door 43a, and the photograph shown in FIG. 4A will be taken. After this, the synchronizer 12 is adjusted to let the flash bulb 13 emit flashlight at time t2 (FIG. 3B) and take down the photograph shown in FIG. 4B. By this operation, the diameter and the speed of the ink particle can be calculated, for example, the speed of the ink particle equals d/(t2−t1)

Figure 9:
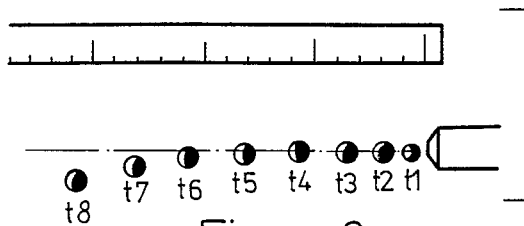
FIG. 9 is a picture showing the consecutive locations of a single ink particle along its moving path.
Figure 8A:
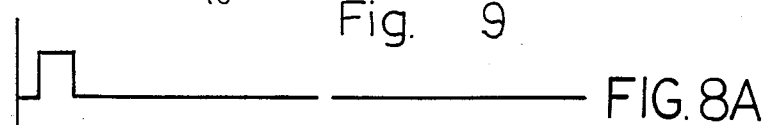
FIGS. 8A, 8B and 8C are waveforms showing the time relationship among pulses sent to nozzle driver and flash synchronizer, respectively, and the flashlight emitted from the flash blub, when the tracing of a single ink particle is to be recorded.
Figure 8B:
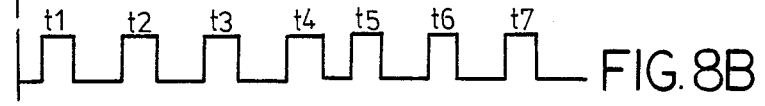
Figure 8C:
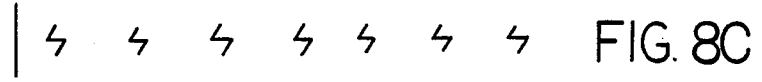

When the tracing of a moving particle is to be recorded, the flash bulb 13 is mounted on the observation door 43a. A single ink particle is ejected by the nozzle 22, and the flash bulb 13 is driven to emit flashlight consecutively at predetermined time intervals. At the same time, the camera take down images of the moving ink particle by catching the reflection of the ink particle. FIG. 9 shows the tracing of the moving ink particle, and FIG. 8A, 8B and 8C are waveforms showing the time relationship among pulses sent to nozzle driver 23 and flash synchronizer 12, respectively, and the flashlight emitted from the flash blub 13 when the tracing of the above single ink particle is recorded.

Figure 6A:
FIGS. 6A, 6B and 6C are waveforms showing the time relationship among pulses sent to nozzle driver and flash synchronizer, respectively, and the flashlight emitted from the flash blub, when the shape-forming process of an ink particle is to be recorded.
Figure 6B:
Figure 6C:
Figure 7A:
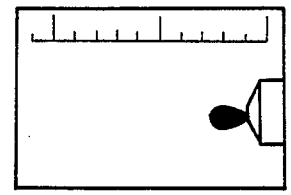
FIGS. 7A and 7B are pictures taken at time t1 and t2 shown in FIG. 6B, respectively.
Figure 7B:
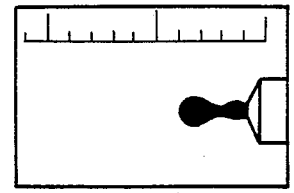

FIG. 6A, 6B and 6C are waveforms showing the time relationship among pulses sent to nozzle driver 23 and flash synchronizer 12, respectively, and the flashlight emitted from the flash blub 13, when the shape of a leading ink particle at the instant of leaving the nozzle 22 is to be taken down, and FIG. 7A and 7B are photographs taken at time t1 and t2 shown in FIG. 6B, respectively, after the nozzle 22 is driven to eject ink particles.

As described above, the dynamic particulate observation apparatus according to this invention is not only cheap and easy to assemble but also renders all the necessary functions of a conventional dynamic particulate observation apparatus.

Although the invention has been described in its preferred form with a certain degree of particularity, it is understood that the present disclosure of the preferred form has been somewhat changed, construction, conbination and arrangement of parts may be referred to without departing from the spirit and the scope of the invention as hereinafter claimed.

What is claim is:

1. A dynamic particulate observation apparatus comprising:
   a black box having an internal space enclosed therewithin, which shields said space from the infiltration of light from outside;
   means for generating particles moving across said black box;
   means for emitting flash light within said black box at a predetermined frequency; and
   means for recording the images of the particles generated by said generating means when said emitting means emits flashlights,
   said emitting means comprising:
   a signal generator for generating signals at a predetermined frequency;
   a controller coupled to said signal generator for receiving signals from said signal generator and generating signals at predetermined timing;
   a flash synchronizer coupled to said controller for receiving signals from said controller and generating signals at a predetermined time lag of signals from said controller; and
   a flash bulb coupled to said synchronizer for receiving signals from said synchronizer and emitting flashlight simultaneously.

2. A dynamic particulate observation apparatus as claimed in claim 1, wherein said generating means comprises:
   an ink reservoir for storing ink;
   a pump for pumping ink from said ink reservoir;
   a pressure control valve communicating with said pump for adjusting ink pressure;
   a nozzle communicating with said valve for ejecting ink particles; and a nozzle driver coupled to said controller for receiving signals from said controller and driving said nozzle to eject ink.

3. A dynamic particulate observation apparatus as claimed in claim 2, wherein said recording means is a camera having a lens.

4. A dynamic particulate observation apparatus as claimed in claim 3, wherein said camera further comprising a scale for providing coordinates relative to the locations of ink particles taken down.

5. A dynamic particulate observation apparatus as claimed in claim 4, wherein the distance between said nozzle and the lens of the camera can be adjusted.

6. A dynamic particulate observation apparatus as claimed in claim 5, wherein said flash bulb and said camera are mounted on the same side of said black box.

7. A dynamic particulate observation apparatus as claimed in claim 5, wherein said flash bulb and said camera are mounted on two opposing sides of said black box respectively.

* * * * *